(12) United States Patent   (10) Patent No.: US 7,032,503 B2
Cai   (45) Date of Patent: Apr. 25, 2006

(54) BREW STATION FOR COFFEE DRINKS

(75) Inventor: Edward Z. Cai, Corvallis, OR (US)

(73) Assignee: Household Technology Group LLC, Camas, WA (US)

( * ) Notice: Subject to any disclaimer, the term of this patent is extended or adjusted under 35 U.S.C. 154(b) by 317 days.

(21) Appl. No.: 10/328,803

(22) Filed: Dec. 24, 2002

(65) Prior Publication Data

US 2004/0118290 A1   Jun. 24, 2004

(51) Int. Cl.
*A47J 31/00* (2006.01)

(52) U.S. Cl. .......................... 99/286; 99/290; 99/298; 210/266; 210/287

(58) Field of Classification Search .................. 99/286, 99/290, 323.3, 298; 210/477, 473, 482, 287, 210/264, 266
See application file for complete search history.

(56) References Cited

U.S. PATENT DOCUMENTS

| 4,660,466 | A | | 4/1987 | Fries |
| 5,127,318 | A | | 7/1992 | Selby |
| 5,325,764 | A | * | 7/1994 | Nakamura et al. ............ 99/282 |
| 5,370,041 | A | * | 12/1994 | Lowe ........................... 99/266 |
| 5,393,548 | A | * | 2/1995 | Heiligman .................... 426/433 |
| 5,473,973 | A | | 12/1995 | Cortese |
| 5,638,740 | A | | 6/1997 | Cai |
| 6,119,582 | A | | 9/2000 | Akkerman-Theunisse et al. |
| 6,202,541 | B1 | * | 3/2001 | Cai .............................. 99/286 |
| 6,708,599 | B1 | * | 3/2004 | Torigai et al. ................. 99/286 |

* cited by examiner

*Primary Examiner*—Reginald L. Alexander (57) ABSTRACT

A hygiene device for a coffee or espresso machine comprises an upper surface for receiving hot water from the machine, a lower surface adapted to be contaminated by flavor-containing materials in a basket while preventing the flavor-containing materials from contaminating the machine, a sufficiently small opening for allowing hot water to pass through to the flavor-containing materials and preventing the flavor-containing materials from reaching the upper surface, and a handle for allowing a user to move the hygiene device to allow the flavor-containing materials contaminated on the lower surface to be washed away. The hygiene device may comprise a seal member for forming an airtight seal with the rim or side wall of basket to enable a vacuum building-up therein to prevent dripping when disposing the wet flavor-containing materials. The hygiene device may also comprise a connector such as a hinge for connecting the hygiene device to basket to allow a user to move the hygiene device to open and close the basket.

37 Claims, 3 Drawing Sheets

BREW STATION FOR COFFEE DRINKS

FIELD OF THE INVENTION

The invention relates to a brewing station for making coffee drinks such as coffee, espresso, latte, cappuccino, hot chocolate and mocha.

BACKGROUND OF THE INVENTION

The brewing station for coffee and espresso machines that extract coffee grounds under pressure includes a brew head, a filter basket and a holder. To brew coffee or espresso, a consumer places the filter basket into the holder, adds coffee grounds into the filter basket, and manually seal and lock the holder to the brew head. One problem that has been accompanying such coffee and espresso machines since their inception centuries ago is the contamination of the brew head by the used coffee grounds. The used, stale coffee grounds on the brew head causes the coffee or espresso brewed to have a stale taste and causes potential leakage at brew head. As a result, to achieve good-tasting coffee the brew head needs to be cleaned frequently or after each use. Unfortunately, such cleaning is difficult and time-consuming to perform because the brew head is not readily accessible and certain areas such as the seal gasket in the brew head require special brush to reach. Another problem is that to achieve good seal between the brew head and filter basket sufficiently high force is required, which imposes undue challenges to those consumers who are physically challenged.

It is an object of the invention to provide a brewing station and method that will prevent the contamination of the brew head by used coffee grounds in the filter basket.

It is a further object of the invention to provide a brewing station for making better tasting coffee, espresso, latte and mocha.

It is a still further object of the invention to provide a brewing station that will enable a seal between the brew head and filter basket to be automatically formed to simplify the brewing process.

It is a still further object of the invention to provide a brewing station and method that will prevent the wet brew basket from dripping during disposing the wet used ground coffee.

Still other objects will become apparent after reading the accompanying drawings and description. It should be understood that the invention could still be practiced without performing one or more of the objects set forth above.

SUMMARY OF THE INVENTION

Accordingly, the invention provides an improved brewing station for a coffee or espresso machine to make better tasting coffee, espresso, hot chocolate, mocha, latte or the like in a simpler and more hygienic way. The brew station includes a hygiene device comprising an upper surface for receiving hot water from the machine, a lower surface adapted to be contaminated by flavor-containing materials while preventing the flavor-containing materials from contaminating the machine, a plurality of sufficiently small openings for allowing hot water to pass through to the flavor-containing materials and preventing the flavor-containing materials from reaching the upper surface, and a handle for allowing a user to move the hygiene device to allow the flavor-containing materials contaminated on the lower surface to be washed away.

In a second preferred embodiment of the invention, the hygiene device further comprises a seal member to form an airtight seal with the rim or side wall of basket to enable a vacuum building-up therein to prevent dripping when disposing the wet flavor-containing materials. In a third preferred embodiment of the invention, the hygiene device further comprises a connector such as a hinge for connecting it to the brew basket to allow a user to move the hygiene device to open and close the basket.

In a forth preferred embodiment of the invention, the hygiene device has a removable connector to allow the user hold the handle to mount and remove the hygiene device to the brew head of the coffee and espresso machines. In the last preferred embodiment of the invention, the brew station further includes an expandable brew head to cause the brew head to form a watertight seal with the brew basket automatically. The expandable head comprises a rigid body having a top and bottom surface, a seal member on the bottom surface of the rigid body for forming the watertight seal with the brew basket, and an expandable chamber in communication with the heating and delivery means of apparatus. The expandable chamber expands in length when hot water is introduced into it under pressure, therefore pushing the rigid body and seal member toward the basket to form the watertight seal.

DESCRIPTION OF THE DRAWING

The accompanying drawing illustrates diagramatically non-limitative embodiment of the invention, as follows.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
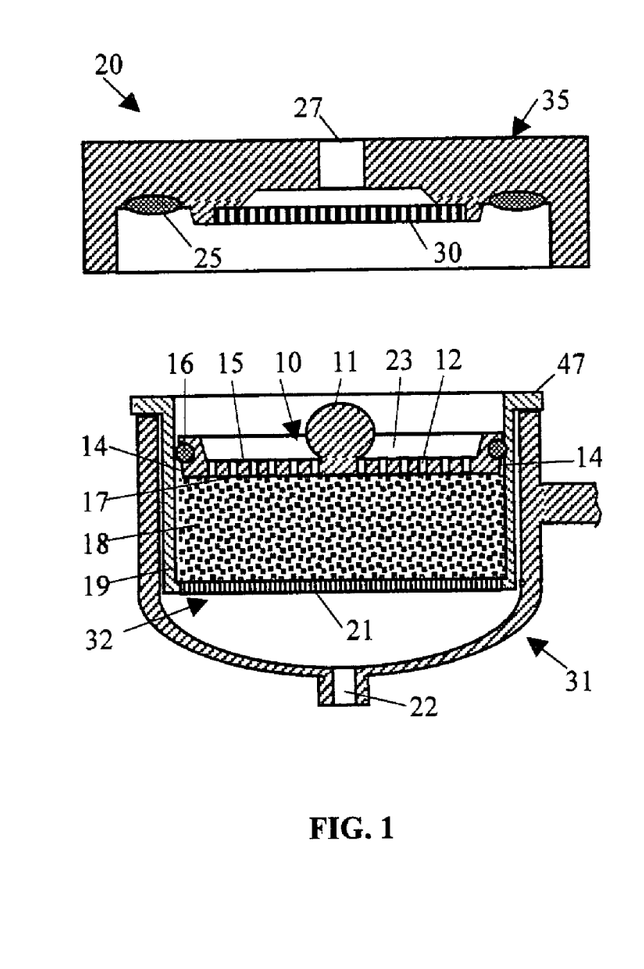
FIG. 1 is a cross-section view of a preferred embodiment of a brew station according to the invention.

FIG. 1 shows a first preferred embodiment of the hygiene device 10 for use with a brew station 20 for a coffee or espresso machine according to the present invention. The brew station 20 comprises a brew basket 32 having a filter 21 for flavor containing materials 18, side wall 19 and a rim 47, a brew head 35 having an outlet 27 for hot water from the heating and delivery system of the machine, a distributor 30 for the hot water and a gasket seal 25 for sealing against the rim 47 of the basket, and a holder 31 having an dispensing spout 22 for receiving the basket 32 and helping securing the seal between the basket and brew head. The brew head, filter basket and holder can be similar to those in existing coffee and espresso machines.

The hygiene device 10 comprises an upper surface 15 for receiving hot water from brew head 35, a lower surface 17 for facing the supply of flavor-containing materials 18 in basket 32, a plurality of small openings 12 for allowing the hot water from the upper surface to pass through to the lower surface and to the flavor-containing materials, and a handle 11 for allowing a user to insert the hygiene device into and move the hygiene device out of the basket. An O-ring 16 is attached to the peripheral side wall 14 to form an airtight seal with the side wall 19 of the basket. The small openings 12 are sufficiently small to substantially prevent the flavor-containing materials from reaching said upper surface 15. The central part 23 of the hygiene device is recessed to reduce the volume or mass of the device and to increase the height of the handle 11.

The lower surface 17, including the part of side wall 14 below the O-ring 14 and the lower side of the O-ring, prevents the flavor-containing materials 18 such as wet coffee grounds in the basket 32 from reaching or contaminating the brew head 35 and the apparatus during and after the brewing process. The hygiene device 10 also keeps the top part of the side wall 19 and the rim 47 of the brew basket 32 free of the messy wet coffee grounds. As a result, the hygiene device 10 has made the brewing with coffee grounds a mess-free and neat process, resolving the problem of the messy and dirty brew head and filter basket that has long associated with coffee and espresso machines. In addition, by incorporating the hygiene device the coffee and espresso machines made better tasting coffee and espresso drinks, possibly because the hygiene device 10 makes the brew heads free of the contamination by the used, stale coffee grounds that gives a stale taste to the drink or/and possibly because the hygiene device improves the extraction of the coffee grounds.

At the end of the brewing, the lower surface 17 may be coated or partially coated with flavor-containing materials, which can be readily washed or rinsed away by pulling the hygiene device 10 out of the basket 32 and placing it in a dishwasher or under the running water in a sink. To facilitate the rinsing or washing of the hygiene device, the side wall 14 and lower surface 17 can be dimensioned to fit sufficiently closely to the side wall 19 of the basket 32 to prevent the flavor-containing materials 18 from reaching the O-ring and even the side wall 14. The lower surface can also be made non-sticky to coffee oil and grounds via the use of non-sticky materials such as ceramic, glass, stainless steel or Teflon materials to facilitate the rinsing or washing.

It was discovered that if the openings 12 were made sufficiently small and the wall surface of the openings 12 were made to be capable of retaining water inside the openings, the basket became substantially drip-free after it was removed from the brew head 35 even though the used flavor-containing materials in the basket were very wet. This allows the user to move the basket 32 containing the hygiene device 10 to waste disposal area to without dripping coffee on the floor or countertQp. It is understood that such dripping has long been a problem for consumers when making espresso drinks with pump espresso machines. It is theorized that a small vacuum is formed between the hygiene device 10 and the filter 21 in the basket to after a very small amount of water drips out of the basket at the end of brewing. This small vacuum below the hygiene device prevents further dripping from occurring.

To allow the hygiene device 10 to fit slidably into the brew basket 32, the side wall 14 and the upper lower surfaces 17 and 15 are preferably shaped to give the hygiene device a cylindrical or disc shape. The lower surface 17 can be made smaller than the upper surface 15 to make the side wall 14 tapered to facilitate the insertion of the hygiene device into the basket. It is appreciated that the hygiene device can be used to tamp the flavor-containing materials in the basket before brewing. To facilitate the tamping, the lower surface 17 can be made convex and the handle 11 made sufficiently large to enable the user to exert sufficient force to the coffee grounds during tamping.

Figure 2:
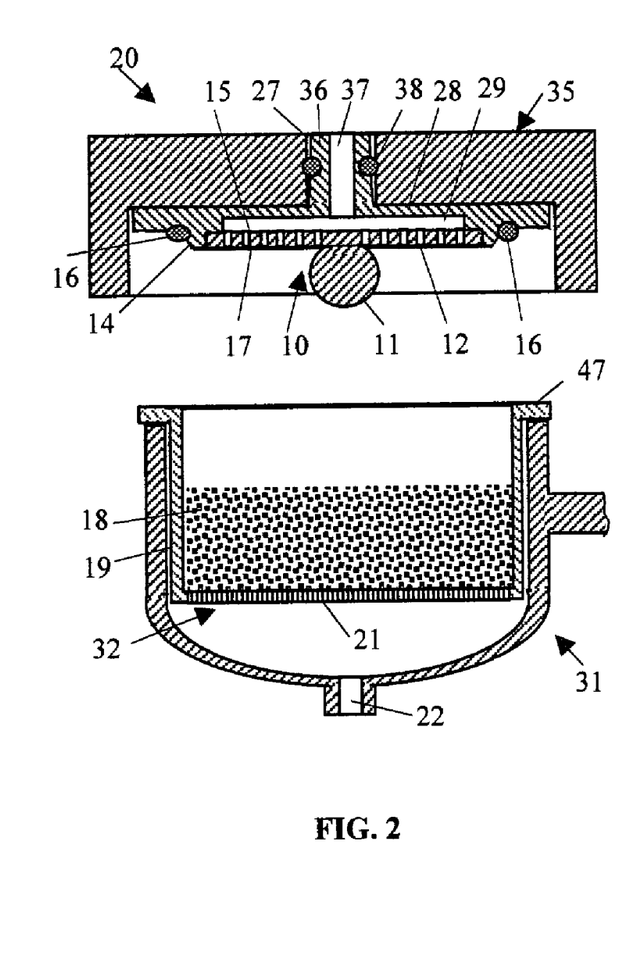
FIG. 2 is a cross-section view of another preferred embodiment of a brew station according to the present invention.

In FIG. 2, the hygiene device 10 is removably mounted to the brew head 35 rather than in the filter basket 32. The O-ring or seal gasket 16 on the hygiene device 10 is configured to form a watertight seal with the rim 47 of the basket 32 when the holder 31 is mounted to the brew head 35. The hygiene device further comprises a water-impermeable wall 28 above the upper surface 15 to form a chamber 29 and a cylinder 36 having a channel 37 connected to the chamber 29. The cylinder 36 is dimensioned to fit into outlet 27 of the apparatus and has an O-ring 38 to form a seal with inside wall of the outlet. To mount or remove the hygiene device, the user simply holds the handle 11 and pushes the cylinder 36 into or pulls the cylinder out of the outlet 27. To facilitate the mounting and removal of the hygiene device 10, the cylinder may be slightly tapered as shown in FIG. 2.

Figure 3:
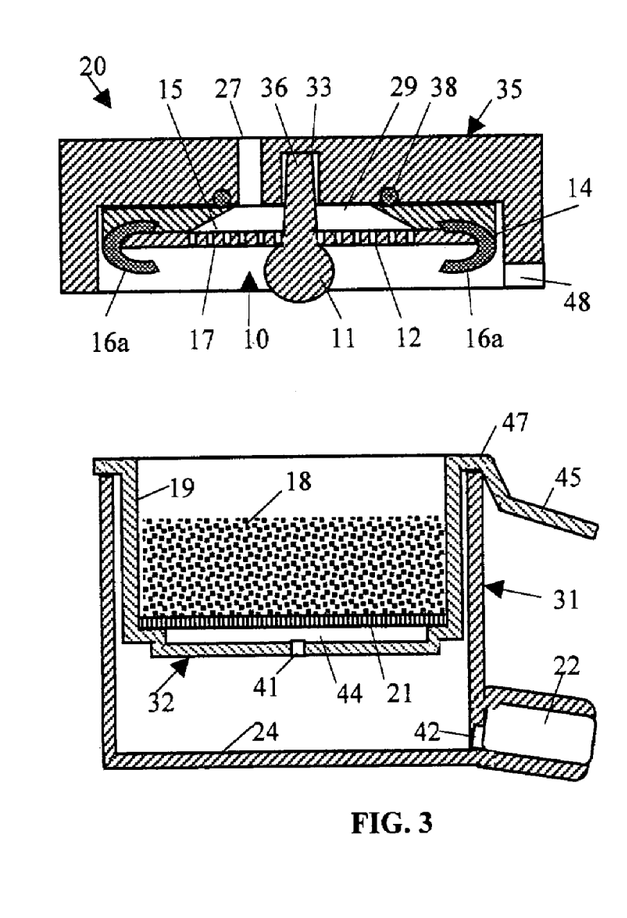
FIG. 3 is a cross-section view of another preferred embodiment of a brew station according to the present invention.

The hygiene device 10 in FIG. 3 is similar to that of FIG. 2 except that a U- or V-shaped seal member 16a is used to replace the O-ring 16 and that the cylinder 36 is solid and receivable into a cylindrical opening 33 rather than into the outlet 27 on brew head 35. In addition, the O-ring 38 is located on the top wall of the brew head 35 to seal the chamber 29. Similarly, to mount or remove the hygiene device 10, the user simply holds the handle 11 and pushes the cylinder 36 into or pulls the cylinder out of the cylindrical opening 33.

Although a brew basket and holder similar to that of FIGS. 1 and 2 can be used with the hygiene device 10 of FIG. 3, a new basket 32 and holder 31 that can facilitate the generation of a crema layer on top of the beverage are presented to show the versatility of the hygiene device. The new holder 31 has a bottom 24 and a sufficiently small opening 42 near the bottom 24 to restrict the flow to the dispensing spout 22, thereby causing a bath of drink below the basket 32. The new basket 32 has a collection chamber 41 below the filter and an orifice 41 for producing a high-speed liquid jet to inject into the bath of liquid in the holder 31 to produce a crema layer for the drink. A handle 45 was attached to the basket and a notch or opening 48 was formed on the brew head to receive the handle 45 when the brew head 35 and holder 31 are brought together to cause the formation of a watertight seal between the seal member 16a and the rim 47.

Figure 4:
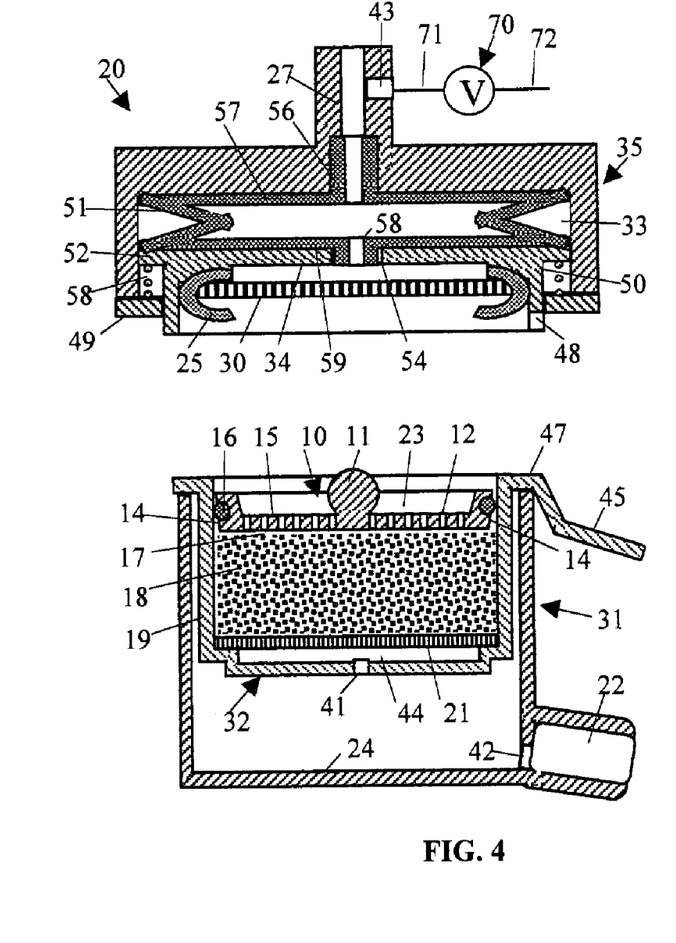
FIG. 4 is a cross-section view of another preferred embodiment of a brew station according to the present invention.

The hygiene device 10 in FIG. 4 is the same as that of FIG. 1 while the brew basket 32 and holder 31 are the same as those of FIG. 3. The brew head 35 of FIG. 4 is different from the brew head of FIG. 1 in that it can expand in length when the hot water is delivered to the brew head through the outlet 27 of the apparatus. Such expansion causes seal member 25 of the brew bead to automatically lowers to the rim 47 of the basket 32 to form a watertight seal, therefore saving the consumers from manually mounting the holder 31 to the brew head 35 to from the watertight seal.

The new expandable head 35 comprises a rigid cylindrical body 50 having a top surface 59, a bottom surface 34 and an opening 54 for the hot water, seal member 25 attached to the bottom surface 34 by the distributor 30 and one or more bolts (not shown) for forming a watertight seal with the rim 47 of the basket 32, and an expandable chamber 33 above the top surface 59. A flexible bag 57 made of elastomer or plastic materials is housed in the expandable chamber 33. The flexible bag 57 has an inlet connected to the outlet 27 of the apparatus, a cylindrical outlet 58 received in the opening 54 of the rigid body 50, and a collapsable side wall 51 adapted to expand in length when the hot water is introduced into the bag 57 under pressure by the heating and delivery system of the apparatus. As the bag 57 expands in length, it pushes the rigid body 50 towards the basket 32 to cause the seal member 25 to form a watertight seal with the rim 47 of the basket. A rigid ring-shaped plate 49 is attached to the bottom end of the brew head 35 and a rim 52 is formed on the top end of the rigid body 50 to prevent the rigid body from being pushed out of the chamber 33. A spring 58 is placed between the rim 52 of the rigid cylindrical body 50 and the plate 50 to push the rigid cylindrical body upwards, therefore moving the seal member 25 away from the rim 47 of the basket, after the apparatus stops delivering hot water into the flexible bag 57. A drain valve 70 is connected to an opening 43 via a tube 71 and to a water reservoir (not shown) of the apparatus via a tube 72 to quickly drain the hot water in the expandable chamber 33 or the flexible bag 57 after the pressure in the flexible bag 57 decreases below a predetermined value. The drain valve can be any valve that closes when the pressure upstream reaches above a predetermined value and that opens when the pressure upstream decreases below a predetermined value.

To make coffee, one adds coffee grounds into the basket 32 and places the hygiene device 10 into the basket above the grounds. One may tamp the coffee grounds by pushing the hygiene device hard against the grounds several times. The basket is placed into holder 31, and the holder is then placed below the brew head 35. The user then turns the water delivery system of the apparatus and causes hot water to be delivered under pressure into the flexible bag 57 via outlet 27. The pressure inside the flexible bag causes it to expand to push the rigid cylindrical member 50 downwards until the seal member 25 reaches the basket 32 and forms a watertight seal between the seal member and the rim 47. The hot water is forced by pressure through the cylindrical outlet 58, the distributor 30, the hygiene device 10 and the coffee grounds 18 to form a coffee drink, which become collected in chamber 44 below the filter 21 and is injected as a drink jet into the holder 31. Quickly a bath of coffee is formed above the bottom 24 and the bath interacts with the drink jet to form crema. The crema and coffee is dispensed into a cup (not shown) below the dispensing spout 22. After a cup is made the hot water delivery system is turned off either automatically or manually, which causes the pressure in the flexible bag 57 to drop. After the pressure drops to a predetermined value, the drain valve 70 opens, causing the hot water in the flexible bag to drain into the reservoir via tube 72. At the same time, the spring 58 pushes the rigid body 50 and the seal member 25 upwards and away from the basket 32 and holder 31, making holder 31 free to be removed from below the brew head 35. The user then takes the basket 32, which is drip-free as a result of the hygiene device 10 in it, to a sink or waste disposal area and removes the hygiene device to dispose the wet used coffee grounds. The basket 32 and hygiene device 10 can be rinsed clean by tap water or washed in a dishwasher.

It is appreciated that a pressure valve that opens only after the pressure upstream reaches a predetermined value may be located in the passageway between the expandable chamber 33 and the distributor 30 to prevent the hot water from exiting the cylindrical outlet 58 until the pressure in the flexible bag reaches above the predetermined value to cause the rigid body 50 and seal member 25 to lower to the basket 32 to form a watertight seal between the seal member 25 and the rim 47 of the basket. It is also appreciated that the cross-section area of the flexible bag or the expandable chamber 33 is preferably larger than that of the basket 32 in order to achieve sufficient seal between the seal member and the rim 47 of the basket 32. It is further appreciated that the flexible bag 57 can be optional or not needed if the cylindrical rim 52 of the cylindrical rigid body 50 is made to be able to seal slidingly to the interior surface of the expandable chamber 33.

Figure 5:
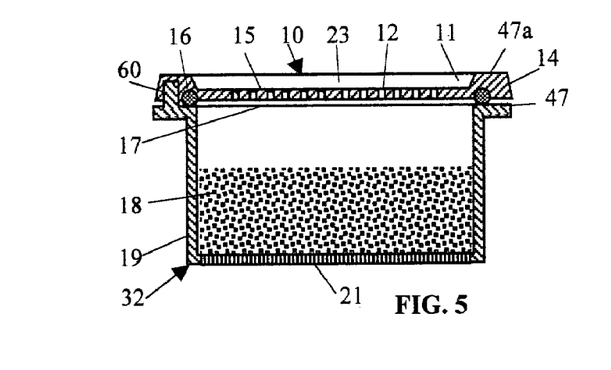
FIGS. 5–6 is cross-section views of two alternative filter baskets for the above brew stations according to the present invention.

FIG. 5 shows a filter basket 32 having the hygiene device 10 connected to it via a connector such as a hinge 60 formed on or attached to the rim 47 of the basket for use with the brew station in FIG. 4. The recessed central area of the hygiene device is used as the handle 11 for the user to turn the hygiene device around the hinge 60 horizontally to open or close the basket 32. The O-ring 16 is located on the lower surface 17 to form a watertight seal with the rim 47. The peripheral edge section 47a of the upper surface 15 is constructed to form a watertight seal with the seal member 25 of the brew head 35.

Figure 6:
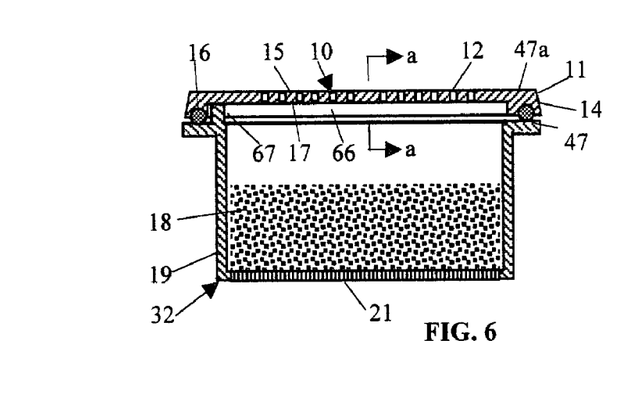
Figure 7:
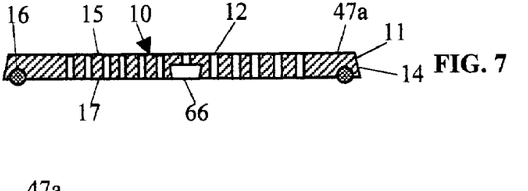
FIG. 7 is a cross-section view taken along line a—a of FIG. 6.

FIG. 6 shows another filter basket 32 having the hygiene device 10 connected by a connector to the basket for use with the brew stations in FIG. 4. The connector comprises a slot 66 (FIGS. 6 and 7) formed on the lower surface 17 and a sliding member 67 on received in the slot. The sliding member is formed on or attached to the rim 47 of the basket. The slot 66 has a larger width near the upper surface 15 than at the lower surface 17 (FIG. 7) and the cross-section of the sliding member 57 has a similar shape to prevent the hygiene device 10 from being disconnected from the basket 32. O-ring 16 is located on the lower surface 17 to form a watertight seal with the rim 47. The peripheral edge section 47a of the upper surface 15 is constructed to form a watertight seal with the seal member 25 of the brew head 35. To move the hygiene device to open the basket, the user pushes the peripheral wall of the hygiene device towards sliding member 67. Here the peripheral wall of the hygiene device functions as the handle 11.

Figure 8:
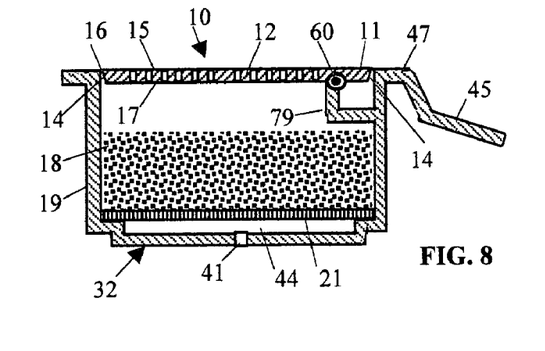
FIGS. 8–9 are cross-section views of two other alternative filter baskets for the above brew stations according to the present invention.

FIG. 8 shows another filter basket 32 having the hygiene device 10 connected by a hinge 60 to the basket for use with the brew stations in FIG. 4. The hinge 60 is supported by a L-shaped beam 79 connected to the side wall 19 of the basket 32, and is connected to the lower surface 17 at a position a predetermined distance apart from the peripheral edge on the right side of the hygiene device. The part of the hygiene device between the right-side peripheral edge and the hinge 60 constitutes the handle 11 for the hygiene device. To open the basket 32, the user pushes the handle 60 downward to cause the hygiene device to turn until the hygiene device becomes substantially vertical in position to fully open the basket.

Figure 9:
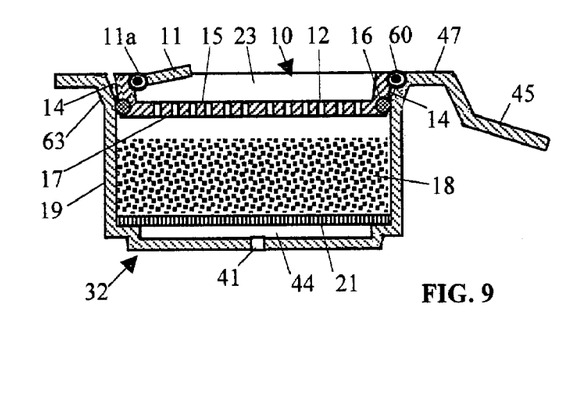

FIG. 9 shows another filter basket 32 having the hygiene device 10 connected by a hinge 60 to the basket for use with the brew stations in FIG. 4. The hinge 60 connects the right end of the side wall 14 to the right upper end of a sloped part 63 of the side wall 19 of the basket 32. A handle 11 is connected to the left side of the side wall 14 by a hinge 11a to allow the user to open the basket 32 by pulling the handle 11 upward to turn the hygiene device around the hinge 60. The O-ring 16 is located on the side wall 14 to form a airtight seal with the side wall 19 of the basket 32 to prevent liquid dripping during the disposal of the wet, used coffee grounds in the basket.

The scope of the invention is obviously not restricted to the various preferred embodiments described by way of examples and depicted in the drawings, there being numerous changes, modifications, combinations, additions, and applications thereof imaginable within the purview of the claims.

What is claimed is:

1. A hygiene device for use with or in an apparatus capable of generating and delivering hot water under pressure to a supply of flavor-containing materials in a container to produce a drink, said hygiene device comprising:
    an upper surface for receiving the hot water from the apparatus;
    a lower surface for facing the supply of flavor-containing materials in the container, said lower surface being adapted to be contaminated by the flavor-containing materials while preventing the flavor-containing materials in the container from contaminating the apparatus;
    at least one opening for allowing the hot water from said upper surface to pass through to said lower surface and to the flavor-containing materials in the container, said at least one opening being sufficiently small to substantially prevent the flavor-containing materials from reaching said upper surface;
    a handle for allowing a user to move said hygiene device to allow the flavor-containing materials contaminated on said lower surface to be washed away; and
    a seal member adapted to form an airtight seal with one of the rim and side wall of the container.

2. A hygiene device as defined in claim 1 wherein said at least one opening is adapted to enable a vacuum to form in the container when wetted by the hot water, thereby preventing the container from dripping when the user moves the container to a waste disposal area to dispose the used wet flavor-containing materials therein.

3. A hygiene device for use with or in an apparatus capable of generating and delivering hot water under pressure to a supply of flavor-containing materials in a container to produce a drink, said hygiene device comprising:
    an upper surface for receiving the hot water from the apparatus;
    a lower surface for facing the supply of flavor-containing materials in the container, said lower surface being adapted to be contaminated by the flavor-containing materials while preventing the flavor-containing materials in the container from contaminating the apparatus;
    at least one opening for allowing the hot water from said upper surface to pass through to said lower surface and to the flavor-containing materials in the container, said at least one opening being sufficiently small to substantially prevent the flavor-containing materials from reaching said upper surface;
    a handle for allowing a user to move said hygiene device to allow the flavor-containing materials contaminated on said lower surface to be washed away; and
    wherein said lower surface has a smaller area than said upper surface to taper the side wall between said upper and lower surfaces to facilitate the insertion of the hygiene device into the container.

4. A hygiene device for use with or in an apparatus capable of generating and delivering hot water under pressure to a supply of flavor-containing materials in a container to produce a drink, said hygiene device comprising:
    an upper surface for receiving the hot water from the apparatus;
    a lower surface for facing the supply of flavor-containing materials in the container, said lower surface being adapted to be contaminated by the flavor-containing materials while preventing the flavor-containing materials in the container from contaminating the apparatus;
    at least one opening for allowing the hot water from said upper surface to pass through to said lower surface and to the flavor-containing materials in the container, said at least one opening being sufficiently small to substantially prevent the flavor-containing materials from reaching said upper surface;
    a handle for allowing a user to move said hygiene device to allow the flavor-containing materials contaminated on said lower surface to be washed away; and
    a connector for connecting said hygiene device to the container, said connector being adapted to allow said hygiene device to move between a first position, in which said hygiene device is away from the container to allow flavor-containing materials to be added into or cleaned from the container, and a second position, in which said hygiene device closes the container to prevent the flavor-containing materials from contaminating the apparatus during brewing.

5. A hygiene device as defined in claim 4 wherein said connector comprises an elongated slot formed on said lower surface and a sliding member receivable in said elongated slot on the container.

6. A hygiene device as defined in claim 4 wherein said handle includes one of a protruded member on said upper surface, a recessed area on said upper surface, and a side wall between said upper and lower surfaces.

7. A hygiene device for use with or in an apparatus capable of generating and delivering hot water under pressure to a supply of flavor-containing materials in a container to produce a drink, said hygiene device comprising:
    an upper surface for receiving the hot water from the apparatus;
    a lower surface for facing the supply of flavor-containing materials in the container, said lower surface being adapted to be contaminated by the flavor-containing materials while preventing the flavor-containing materials in the container from contaminating the apparatus;
    at least one opening for allowing the hot water from said upper surface to pass through to said lower surface and to the flavor-containing materials in the container, said at least one opening being sufficiently small to substantially prevent the flavor-containing materials from reaching said upper surface;
    a handle for allowing a user to move said hygiene device to allow the flavor-containing materials contaminated on said lower surface to be washed away; and
    a hinge for connecting said hygiene device to the container.

8. A hygiene device as defined in claim 7 wherein said hinge is positioned a predetermined distance apart from an edge of said lower surface to enable the user to turn said hygiene device, thereby opening the container, by simply pushing the part of said upper surface between said edge and hinge.

9. A hygiene device as defined in claim 7 wherein said hinge is adapted to allow said hygiene device to turn substantially horizontally.

10. A hygiene device as defined in claim 7 wherein said hinge is adapted to allow said hygiene device to turn substantially vertically.

11. A hygiene device for use with or in an apparatus capable of generating and delivering hot water under pressure to a supply of flavor-containing materials in a container to produce a drink, said hygiene device comprising:
- an upper surface for receiving the hot water from the apparatus;
- a lower surface for facing the supply of flavor-containing materials in the container, said lower surface being adapted to be contaminated by the flavor-containing materials while preventing the flavor-containing materials in the container from contaminating the apparatus;
- at least one opening for allowing the hot water from said upper surface to pass through to said lower surface and to the flavor-containing materials in the container, said at least one opening being sufficiently small to substantially prevent the flavor-containing materials from reaching said upper surface;
- a handle for allowing a user to move said hygiene device to allow the flavor-containing materials contaminated on said lower surface to be washed away; and
- a seal member adapted to form a watertight seal with the container and a chamber in communication with the apparatus for introducing hot water to said upper surface, said seal member being adapted to cause substantially all hot water from said chamber to pass through the flavor-containing materials to brew a drink.

12. A hygiene device for use with or in an apparatus capable of generating and delivering hot water under pressure to a supply of flavor-containing materials in a container to produce a drink, said hygiene device comprising:
- an upper surface for receiving the hot water from the apparatus;
- a lower surface for facing the supply of flavor-containing materials in the container, said lower surface being adapted to be contaminated by the flavor-containing materials while preventing the flavor-containing materials in the container from contaminating the apparatus;
- at least one opening for allowing the hot water from said upper surface to pass through to said lower surface and to the flavor-containing materials in the container, said at least one opening being sufficiently small to substantially prevent the flavor-containing materials from reaching said upper surface;
- a handle for allowing a user to move said hygiene device to allow the flavor-containing materials contaminated on said lower surface to be washed away; and
- a water-impermeable wall above said upper surface, a chamber formed between said upper surface and water-impermeable wall, a hot water inlet on said water-impermeable wall for allowing the hot water from the apparatus to enter said chamber, and a seal member adapted to form a watertight seal with the container, said hot water inlet and said handle being adapted to allow the user to removably mounting the hygiene device to the apparatus.

13. A brew station for an apparatus having a heater for generating hot water and an outlet for the hot water, said brew station comprising:
- a container for receiving flavor-containing materials and for allowing the flavor-containing materials to interact therein with the hot water to produce a drink;
- a holder for holding said container in position in the apparatus; and
- a movable hygiene device for preventing the flavor-containing materials in said container from contaminating the apparatus, said hygiene device comprising an upper surface for facing the outlet of the apparatus, a lower surface for facing the flavor-containing materials in said container and being adapted to be contaminated by the flavor-containing materials while preventing the flavor-containing materials from contaminating the apparatus, at least one opening for allowing the hot water from said upper surface to pass through to said lower surface and to the flavor-containing materials in said container, said at least one opening being sufficiently small to substantially prevent the flavor-containing materials from reaching said upper surface, and a handle for allowing a user to move said movable hygiene device to allow the flavor-containing materials contaminated on said lower surface to be washed away; and
- a seal member adapted to form an airtight seal with one of the rim and side wall of said container, wherein said at least one opening is adapted to allow a vacuum to form in the container when wetted by the hot water, thereby preventing the container from dripping when the user moves the container to a waste disposal area to dispose the used wet flavor-containing materials therein.

14. A brew station for an apparatus having a heater for generating hot water and an outlet for the hot water, said brew station comprising:
- a container for receiving flavor-containing materials and for allowing the flavor-containing materials to interact therein with the hot water to produce a drink;
- a holder for holding said container in position in the apparatus;
- a movable hygiene device for preventing the flavor-containing materials in said container from contaminating the apparatus, said hygiene device comprising an upper surface for facing the outlet of the apparatus, a lower surface for facing the flavor-containing materials in said container and being adapted to be contaminated by the flavor-containing materials while preventing the flavor-containing materials from contaminating the apparatus, at least one opening for allowing the hot water from said upper surface to pass through to said lower surface and to the flavor-containing materials in said container, said at least one opening being sufficiently small to substantially prevent the flavor-containing materials from reaching said upper surface, and a handle for allowing a user to move said movable hygiene device to allow the flavor-containing materials contaminated on said lower surface to be washed away; and
- a connector for connecting said hygiene device to the container, said connector being adapted to allow said hygiene device to move between a first position, in which said hygiene device is away from the container to allow flavor-containing materials to be added into or cleaned from the container, and a second position, in which said hygiene device closes the container to prevent the flavor-containing materials from contaminating the apparatus during brewing.

15. A brew station as defined in claim 14 wherein said connector comprises a hinge.

16. A brew station for an apparatus having a heater for generating hot water and an outlet for the hot water, said brew station comprising:
- a container for receiving flavor-containing materials and for allowing the flavor-containing materials to interact therein with the hot water to produce a drink;
- a movable hygiene device for preventing the flavor-containing materials in said container from contaminating the apparatus, said hygiene device comprising an upper surface for facing the outlet of the apparatus, a lower surface for facing the flavor-containing materials in said container and being adapted to be contaminated by the flavor-containing materials, at least one opening for allowing the hot water from said upper surface to pass through to said lower surface and to the flavor-containing materials in said container, said at least one opening being sufficiently small to substantially prevent the flavor-containing materials from reaching said upper surface, and a handle for allowing a user to move said movable hygiene device to allow the flavor-containing materials contaminated on said lower surface to be washed away; and a seal member adapted to form a watertight seal with said container and a chamber in communication with the outlet for introducing hot water to said upper surface, said seal member being adapted to cause substantially all hot water from the outlet and said chamber to pass through the flavor-containing materials in said container to brew a drink.

17. A brew station as defined in claim 16 further comprising a brew head containing the outlet for hot water and a connector for removably mounting said hygiene device to said brew head.

18. A brew station as defined in claim 17 wherein said seal member is affixed to said hygiene device for forming said watertight seal between said hygiene device and said container, thereby causing said seal member to be removed together with said hygiene device from said brew head for cleaning.

19. A brew station as defined in claim 17 further comprising a second seal member for forming a watertight seal between said brew head and said movable hygiene device to cause all or substantially all hot water from the outlet to flow through said at least one opening into the container.

20. A brew station as defined in claim 19 wherein said second seal member has a periphery substantially smaller than the periphery of said seal member.

21. A brew station as defined in claim 19 wherein said second seal member is affixed to said hygiene device.

22. A brew station as defined in claim 19 wherein said second seal member is affixed to said brew head.

23. A brew station as defined in claim 17 wherein said connector and said handle are so configured that said handle is pushed toward said brew head to mount said hygiene device to said brew head and is pulled to remove said hygiene device from said brew head for cleaning.

24. A brew station for an apparatus having a heater for generating hot water and an outlet for the hot water, said brew station comprising:
  a container for receiving flavor-containing materials and for allowing the flavor-containing materials to interact therein with the hot water to produce a drink;
  a movable hygiene device for preventing the flavor-containing materials in said container from contaminating the apparatus, said hygiene device comprising an upper surface for facing the outlet of the apparatus, a lower surface for facing the flavor-containing materials in said container and being adapted to be contaminated by the flavor-containing materials, at least one opening for allowing the hot water from said upper surface to pass through to said lower surface and to the flavor-containing materials in said container, said at least one opening being sufficiently small to substantially prevent the flavor-containing materials from reaching said upper surface, and a handle for allowing a user to move said movable hygiene device to allow the flavor-containing materials contaminated on said lower surface to be washed away; and
  a water-impermeable wall above said upper surface, a chamber formed between said upper surface and water-impermeable wall, a hot water inlet on said water-impermeable wall for allowing the hot water from the outlet of the apparatus to enter said chamber, and a seal member adapted to form a watertight seal with the container, said handle being adapted to allow the user to removably mount the hygiene device to the apparatus.

25. A brew station as defined in claim 24 wherein said water-impermeable wall is connected to said movable hygiene device and wherein said seal member is connected to one of said water-impermeable wall and said movable hygiene device, thereby allowing said water-impermeable wall, chamber, seal member and hygiene device to be removed as an assembly for cleaning.

26. A brew station as defined in claim 24 further comprising a second seal member to form a watertight seal between said hot water inlet on said water-impermeable wall and the outlet of the apparatus.

27. A brew station for an apparatus having a heater for generating hot water and an outlet for the hot water, said brew station comprising:
  a container for receiving flavor-containing materials and for allowing the flavor-containing materials to interact therein with the hot water to produce a drink;
  a movable hygiene device for preventing the flavor-containing materials in said container from contaminating the apparatus, said hygiene device comprising an upper surface for facing the outlet of the apparatus, a lower surface for facing the flavor-containing materials in said container and being adapted to be contaminated by the flavor-containing materials while preventing the flavor-containing materials from contaminating the apparatus, at least one opening for allowing the hot water from said upper surface to pass through to said lower surface and to the flavor-containing materials in said container, said at least one opening being sufficiently small to substantially prevent the flavor-containing materials from reaching said upper surface, and a handle for allowing a user to move said movable hygiene device to allow the flavor-containing materials contaminated on said lower surface to be washed away; and
  a drain valve for draining the hot water above said upper surface of said hygiene device after the pressure in said container decreases to a predetermined value.

28. A brew station for an apparatus having a heater for generating hot water and an outlet for the hot water, said brew station comprising:
  a container for receiving flavor-containing materials and for allowing the flavor-containing materials to interact therein with the hot water to produce a drink;
  a movable hygiene device for preventing the flavor-containing materials in said container from contaminating the apparatus, said hygiene device comprising an upper surface for facing the outlet of the apparatus, a lower surface for facing the flavor-containing materials in said container and being adapted to be contaminated by the flavor-containing materials while preventing the flavor-containing materials from contaminating the apparatus, at least one opening for allowing the hot water from said upper surface to pass through to said lower surface and to the flavor-containing materials in said container, said at least one opening being sufficiently small to substantially prevent the flavor-containing materials from reaching said upper surface, and a handle for allowing a user to move said movable hygiene device to allow the flavor-containing materials contaminated on said lower surface to be washed away; and an expandable water distribution head having an inlet in communication with the outlet of the apparatus and a seal member, said distribution head being adapted to expand in length to cause said seal member to form a watertight seal with said container when the hot water is introduced under pressure into said inlet.

29. A brew basket for a brewing apparatus having a heater for generating hot water and a brew head, said brew basket comprising:

a container for receiving flavor-containing materials, said container being adapted to be removably mounted to the brew head to receive the hot water and to allow the hot water to interact with the flavor-containing materials therein to produce a drink; and a movable hygiene device for preventing the flavor-containing materials in said container from contaminating the brew head of apparatus, said hygiene device comprising an upper surface for facing the brew head of the apparatus, a lower surface for facing the flavor-containing materials in said container and being adapted to be contaminated by the flavor-containing materials while preventing the flavor-containing materials from contaminating the brew head of the apparatus, at least one opening for allowing hot water from said upper surface to pass through to said lower surface and to the flavor-containing materials in said container, said at least one opening being sufficiently small to substantially prevent the flavor-containing materials from reaching said upper surface, and a handle for allowing a user to move said movable hygiene device to allow the flavor-containing materials contaminated on said lower surface to be washed away.

30. A brew basket as defined in claim 29 wherein said movable hygiene device further comprises a seal member adapted to form an airtight seal with one of the rim and side wall of said container, wherein said at least one opening is adapted to have a sufficiently high air-breakthrough pressure when wetted by the hot water to enable a vacuum to build up in the container, thereby preventing the container from dripping when the user moves the container to a waste disposal area to dispose the used wet flavor-containing materials therein.

31. A brew basket as defined in claim 29 wherein said lower surface and handle of said movable hygiene device are adapted to allow the user to use said hygiene device to tamp the flavor-containing materials in the container.

32. A brew basket as defined in claim 29 wherein said movable hygiene device further comprises a connector for connecting said hygiene device to said container, said connector being adapted to allow said hygiene device to move between a first position, in which said hygiene device is away from said container to allow flavor-containing materials to be added into or cleaned from the container, and a second position, in which said hygiene device closes said container to prevent the flavor-containing materials from contaminating the brew head and apparatus during brewing.

33. A brew basket as defined in claim 32 wherein said connector comprises a hinge.

34. A hygiene device for use with a container adapted to contain a supply of flavor-containing materials and to receive hot water from a brewing apparatus, containing a new brew head, the container being in direct contact with the new brew head and allow the hot water to interact with the flavor-containing materials therein to produce a drink, said hygiene device comprising:

an upper surface adapted to face the brew head of the apparatus;

a lower surface adapted to face the flavor-containing materials in the container and to be contaminated by the flavor-containing materials;

at least one opening for allowing hot water from said upper surface to pass through to said lower surface and to the flavor-containing materials in said container, said at least one opening being sufficiently small to substantially prevent the flavor-containing materials from reaching said upper surface;

a handle for allowing a user to remove said hygiene device from the container to allow the flavor-containing materials contaminated on said lower surface to be washed away;

a peripheral side wall between said upper and lower surfaces, said side wall being adapted to allow one to hold said handle to slide or insert said hygiene device into the container prior to a brewing process and to remove said hygiene device from the container after the brewing process for washing or rinsing, said peripheral sidewall comprises a seal member dimensioned to allow said device to fit slidably or snugly into the container; and wherein during a brewing process, said hygiene device is adapted to stay inside the container to keep the supply of flavor-containing materials substantially below said lower surface of said hygiene device in the container, thereby preventing the brewing apparatus and the brew head from being contaminated by the flavor-containing materials.

35. A brew basket as defined in claim 34 wherein said peripheral side wall is sufficiently small to allow said hygiene device to be pressed sufficiently into the container to cause said lower surface to tamp or compress the flavor-containing materials therein.

36. A brew basket as defined in claim 34 wherein the central part of said hygiene device is recessed.

37. A brew basket as defined in claim 34 wherein said lower surface comprises a material that is non-sticky to coffee grounds or coffee oil to facilitate the washing or rinsing of said hygiene device after the brewing process.

* * * * *